(12) United States Patent
Goto et al.

(10) Patent No.: US 7,742,281 B2
(45) Date of Patent: Jun. 22, 2010

(54) SOLID ELECTROLYTIC CAPACITOR

(75) Inventors: Kohei Goto, Daito (JP); Kazuhiro Kato, Daito (JP); Yoshikazu Hirata, Daito (JP); Yuji Miyachi, Daito (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 231 days.

(21) Appl. No.: 11/965,043

(22) Filed: Dec. 27, 2007

(65) Prior Publication Data

US 2008/0158783 A1 Jul. 3, 2008

(30) Foreign Application Priority Data

Dec. 27, 2006 (JP) .............................. 2006-351939

(51) Int. Cl.
*H01G 9/02* (2006.01)
(52) U.S. Cl. ...................... 361/525; 29/25.03
(58) Field of Classification Search ......... 361/523–529; 29/25.03
See application file for complete search history.

(56) References Cited

U.S. PATENT DOCUMENTS 4,858,078 A * 8/1989 Morimoto et al. ............ 361/527
5,812,367 A * 9/1998 Kudoh et al. ................. 361/523
6,430,033 B1 * 8/2002 Mitsui et al. ................. 361/525

FOREIGN PATENT DOCUMENTS

JP      2005-116777 A     4/2005

\* cited by examiner

*Primary Examiner*—Eric Thomas
(74) *Attorney, Agent, or Firm*—Westerman, Hattori, Daniels & Adrian, LLP

(57) ABSTRACT

The present invention is a solid electrolytic capacitor having a dielectric coating film, a solid electrolytic layer, and a cathode lead-out layer on a peripheral surface of an anode body in this order, in which the solid electrolytic layer is equipped with at least a first electrolytically polymerized layer and a second electrolytically polymerized layer formed by electrolytic polymerization of the same monomer, and the first electrolytically polymerized layer and the second electrolytically polymerized layer contain a different dopant. With this configuration, a solid electrolytic capacitor is provided that is superior in an ESR characteristic and also superior in heat resistance without deteriorating leakage current.

20 Claims, 1 Drawing Sheet

SOLID ELECTROLYTIC CAPACITOR

BACKGROUND OF THE INVENTION

1. Field of the Invention

The present invention relates to a solid electrolytic capacitor using a conductive polymer as a solid electrolyte.

2. Description of the Background Art

In recent years, a capacitor for high frequency having a low impedance in the high frequency range, a small size, and a large capacity has been demanded in accordance with miniaturization and reduction of weight of electronic devices.

A mica capacitor, a film capacitor, a ceramic capacitor, and the like are used as a capacitor for high frequency. However, these capacitors are the type of capacitor that is not suitable for a large capacity.

On the other hand, a capacitor suitable for increasing capacity includes an aluminum electrolytic capacitor, a tantalum electrolytic capacitor, and the like. The aluminum electrolytic capacitor is capable of achieving a large capacity with low cost. However, there are problems in which, because an electrolytic liquid is used, the change with the passage of time of capacitor characteristics occurs due to evaporation of the electrolytic liquid, and impedance in the high frequency range is high.

The tantalum solid electrolytic capacitor is a capacitor with less capacity deterioration because solid manganese dioxide is used as an electrolyte. However, because the coating film of manganese dioxide is poor in self-repairing property, there is a weak point of a danger such as combustion in the case that the dielectric coating film gets damaged during power distribution.

Therefore, in recent years, in order to solve the above-described problems, it is proposed to use a conductive polymer which is superior in conductivity and is allowed to easily form a solid electrolytic layer as a solid electrolyte. According to this method, a solid electrolytic capacitor with low manufacturing cost, sufficient capacitance to be certainly obtained, no damage of a dielectric coating film, and less leakage current, as compared with the above-described solid electrolytic capacitor has been obtained. Here, a polymer obtained by polymerizing pyrrole, thiophene, furan, aniline, and the like is used as the conductive polymer.

However, also in the solid electrolytic capacitor in which such a conductive polymer is used as a solid electrolyte, a reduction of equivalent series resistance (ESR), a further reduction of leakage current (LC), and the like are demanded in order to improve reliability.

In Japanese Patent Laying-Open No. 2005-116777, in order to solve the problems, a method of forming a conductive polymer as a solid electrolytic layer using a electrolytic polymerizing liquid obtained by mixing a plurality of dopants having different characteristics is proposed.

SUMMARY OF THE INVENTION

However, in the method described in Japanese Patent Laying-Open No. 2005-116777, there is a problem that unevenness in a polymerization state is generated and uniformity of the obtained solid electrolytic layer is lacking because a plurality of types of dopants having different characteristics are contained in the electrolytic polymerization liquid at the same time and optimum conditions of these dopants in a polymerization reaction for forming a solid electrolytic layer are different from each other. Further, there is a case that a solid electrolytic capacitor having a solid electrolytic layer obtained in such a method has low ESR and is superior in heat resistance. However, there is a problem of large LC.

The present invention is provided with a solid electrolytic capacitor having a dielectric coating film, a solid electrolytic layer, and a cathode lead-out layer on a peripheral surface of an anode body in this order, in which the solid electrolytic layer is arranged on the dielectric coating film side and equipped at least a first electrolytically polymerized layer formed by electrolytic polymerization of a monomer and a second electrolytically polymerized layer arranged on a side closer to the cathode lead-out layer than the first electrolytically polymerized layer and formed by electrolytic polymerization of the same monomer as the monomer used in a formation of the first electrolytically polymerized layer, the first electrolytically polymerized layer contains a first dopant, and the second electrolytically polymerized layer contains a second dopant different from the first dopant.

The first electrolytically polymerized layer preferably does not contain the second dopant contained in the second electrolytically polymerized layer. Further, the second electrolytically polymerized layer preferably does not contain the first dopant contained in the first electrolytically polymerized layer. Furthermore, it is more preferable that the first electrolytically polymerized layer does not contain the second dopant contained in the second electrolytically polymerized layer and the second electrolytically polymerized layer does not contain the first dopant contained in the first electrolytically polymerized layer.

The first dopant is preferably an alkyl aromatic sulfonate ion, an adamantane sulfonate ion, or an adamantane carbonate ion. Further, the second dopant is preferably an aromatic polysulfonate ion, a carbonyl aromatic sulfonate ion, or an aromatic quinone sulfonate ion.

In a specific embodiment of the present invention, the solid electrolytic capacitor has a small leakage current compared with the solid electrolytic capacitor containing the second dopant in the first electrolytically polymerized layer. Further, in the specific embodiment of the present invention, the solid electrolytic capacitor has low equivalent series resistance (ESR) compared with the capacitor containing the first dopant in the second electrolytically polymerized layer.

According to the present invention, stable electrolytic polymerization is possible in the formation of the solid electrolytic layer because an optimum condition for polymerization reaction can be set for each dopant.

Further, according to the present invention, a solid electrolytic capacitor in which the LC characteristic and ESR characteristic are good can be provided. In the case of using a conductive polymer layer in which LC is large, capacitance tends to decrease because charge flows in the direction of the dielectric coating film and a sintered body (an anode body). Further, when ESR is large although the LC characteristic is good, it becomes not able to correspond to high frequency. Therefore, according to the present invention, a solid electrolytic capacitor that prevents the decrease of capacity by forming an electrolytically polymerized film with a good LC characteristic on a side near to the anode body and the dielectric coating film and that can correspond also to high frequency by layering an electrolytically polymerized film with a good ESR characteristic on the electrolytically polymerized film with a good LC characteristic for example.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
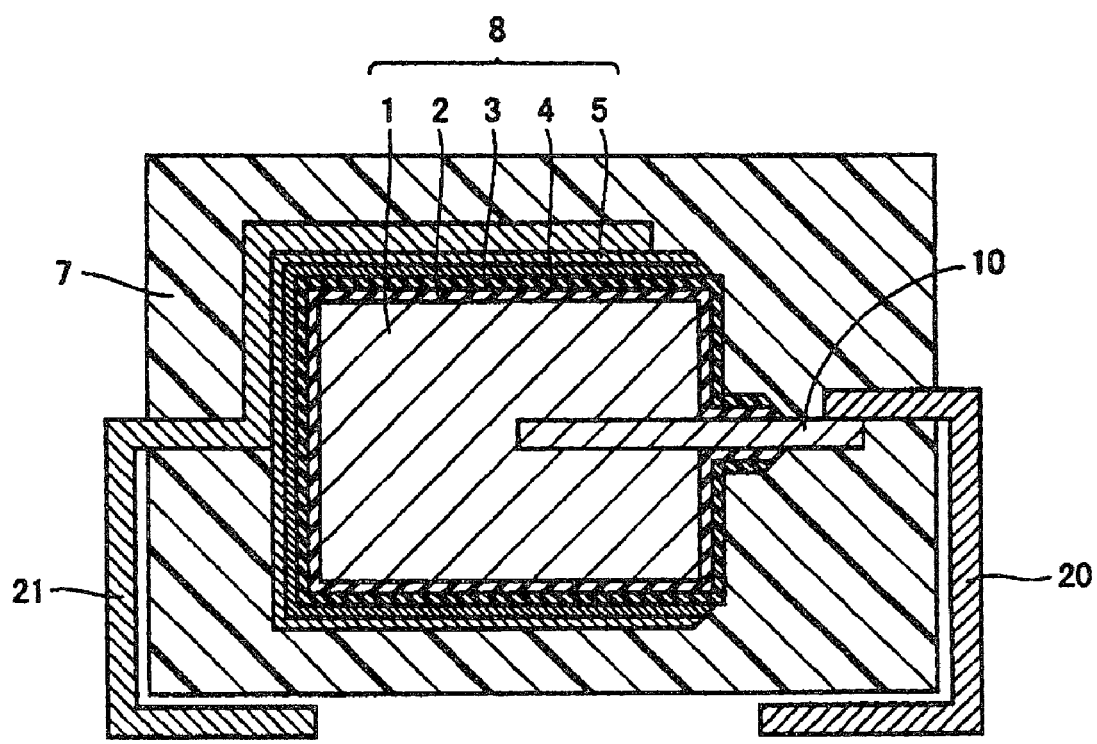
FIG. 1 is a cross-sectional view showing one example of a solid electrolytic capacitor of the present invention.

The best embodiment in the present invention is described using FIG. 1. The solid electrolytic capacitor shown in FIG. 1 is equipped with a capacitor element 8, and capacitor element 8 has an anode body 1 having an anode lead 10, a dielectric coating film 2 formed on the peripheral surface of anode body 1, a solid electrolytic layer 3 made of a conductive polymer, a carbon layer 4, and a silver paste layer 5 as a cathode lead-out layer. An anode terminal 20 is connected to anode lead 10, and a cathode terminal 21 is connected to silver paste layer 5.

Solid electrolytic layer 3 is equipped with at least a first electrolytically polymerized layer and a second electrolytically polymerized layer made of a conductive polymer; a monomer used in the formation of the first electrolytically polymerized layer and a monomer used in the formation of the second electrolytically polymerized layer are the same. The first electrolytically polymerized layer is positioned on the side closer to dielectric coating film 2 than the second electrolytically polymerized layer, and the second electrolytically polymerized layer is formed on the first electrolytically polymerized layer. The first electrolytically polymerized layer contains a first dopant, and the second electrolytically polymerized layer contains a second dopant that is a different type from the first dopant. In the present embodiment, the first electrolytically polymerized layer does not contain the second dopant contained in the second electrolytically polymerized layer.

Here, a heterocyclic compound such as pyrrole, thiophene, and furan can be specifically used as the monomer.

Examples of the first dopant contained in the first electrolytically polymerized layer include an aromatic sulfonate ion, an adamantane sulfonate ion, an adamantane carbonate ion, and the like, which are substituted or unsubstituted with an alkyl group. Here, the aromatic sulfonate ion substituted with an alkyl group is referred to as a benzene sulfonate ion having an alkyl group, a naphthalene sulfonate ion having an alkyl group, a tetrahydronaphthalene sulfonate ion having an alkyl group, and the like. By equipping with such an electrolytically polymerized layer containing the first dopant, the LC of the solid electrolytic capacitor can be made small.

The benzene sulfonate ion is an ion represented by a Formula (1) described below.

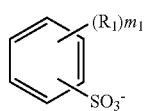

(1)

In Formula (1), $m_1$ is the number of an alkyl group ($R_1$ group) and can be an arbitrary integer of 0 or more with a range in which substitution is possible. Further, $R_1$ represents an alkyl group having 1 to 20 carbon atoms. The benzene sulfonate ion containing one or more alkyl groups ($R_1$ groups) ($m_1 \geq 1$) has a large emulsifying power to the conductive polymer to easily dissolve compared with the benzene sulfonate ion not containing an alkyl group ($R_1$ group) ($m_1 = 0$). When the number of carbon atoms in the alkyl group ($R_1$ group) exceeds 20, heat resistance tends to decrease. Moreover, in the case of containing two or more alkyl groups ($R_1$ groups), the number of carbon atoms in each alkyl group ($R_1$ group) may be different from each other or may be the same.

Specific examples of the benzene sulfonate ion represented by Formula (1) include a benzene sulfonate ion, a p-toluene sulfonate ion, a monododecylbenzene sulfonate ion, a monooctylbenzenesulfonate ion, a dioctylbenzene sulfonate ion, and the like. The difference in the number of the alkyl group ($R_1$) does not largely affect the LC reduction of the solid electrolytic capacitor, and any of a monoalkyl body, a dialkyl body, a trialkyl body, and the like may be used.

Further, the naphthalene sulfonate ion is represented by a Formula (2) described below.

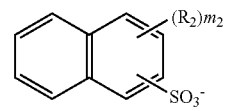

(2)

In Formula (2), $m_2$ is the number of an alkyl group ($R_2$ group) and can be an arbitrary integer of 0 or more with a range in which substitution is possible. Further, $R_2$ represents an alkyl group having 1 to 20 carbon atoms. The naphthalene sulfonate ion containing one or more alkyl groups ($R_2$ groups) ($m_2 \geq 1$) has a large emulsifying power to the conductive polymer to easily dissolve compared with the naphthalene sulfonate ion not containing an alkyl group ($R_2$ group) ($m_2 = 0$). In the case of containing two or more alkyl groups ($R_2$ groups), the number of carbon atoms in each alkyl group ($R_2$ group) may be different from each other or may be the same. Moreover, in Formula (2), the alkyl group ($R_2$ group) and a sulfonate ion group ($SO_3^-$ group) can be at any positions of a naphthalene ring with a range in which hydrogen in the naphthalene ring can be substituted as long as the orientation condition is satisfied.

Specific examples of the naphthalene sulfonate ion represented by Formula (2) include naphthalene sulfonate ion, a monomethyl naphthalene sulfonate ion, a dimethylnaphthalene sulfonate ion, a monobutylnaphthalene sulfonate ion, a dibutylnaphthalene sulfonate ion, and the like. The difference in the number of the alkyl group ($R_2$) does not largely affect the LC reduction of the solid electrolytic capacitor, and any of a monoalkyl body, a dialkyl body, a trialkyl body, and the like may be used.

The tetrahydronaphthalene sulfonate ion is represented by a Formula (3) described below.

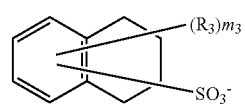

(3)

In Formula (3), $m_3$ is the number of an alkyl group ($R_3$ group) and can be an arbitrary integer of 0 or more with a range in which substitution is possible. Further, $R_3$ represents an alkyl group having 1 to 20 carbon atoms. The tetrahydronaphthalene sulfonate ion containing one or more alkyl groups ($R_3$ groups) ($m_3 \geq 1$) has a large emulsifying power to the conductive polymer to easily dissolve compared with the tetrahydronaphthalene sulfonate ion not containing an alkyl group ($R_3$ group) ($m_3 = 0$). When the number of carbon atoms in the alkyl group ($R_3$ group) exceeds 20, heat resistance tends to decrease. Further, in the case of containing two or more alkyl groups ($R_3$ groups), the number of carbon atoms in each alkyl group ($R_3$ group) may be different from each other or may be the same.

Specific examples of the tetrahydronaphthalene sulfonate ion represented by the Formula (3) include a tetrahydronaphthalene sulfonate ion, a monobutyltetrahydronaphthalene sulfonate ion, a diisopropyltetrahydronaphthalene sulfonate ion, a dinonyltetrahydronaphthalene sulfonate ion, and the like. The difference in the number of the alkyl group ($R_3$) does not largely affect the LC reduction of the solid electrolytic capacitor, and any of a monoalkyl body, a dialkyl body, a trialkyl body, and the like may be used.

An alkyl group of the alkyl substituted aromatic sulfonate ion may be a substituted alkyl group, a part of which ($R_1$, $R_2$, or $R_3$) is substituted. For example, it may be a halogen substituted alkyl group, a part of which is substituted with a halogen group ($F^-$ group, $Cl^-$ group, $Br^-$ group, or $I^-$ group).

The adamantane carbonate ion and adamantane sulfonate ion have a structure represented by a Formula (4) described below.

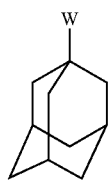

(4)

In Formula (4), an ion in which a substituent W is a carbonate ion group ([$COO^-$] group) is the adamantane carbonate ion, and an ion in which the substituent W is a sulfonate ion group ([$SO_3^-$] group) is the adamantane sulfonate ion.

Further, examples of the second dopant contained in the second electrolytically polymerized layer include an aromatic polysulfonate ion, a carbonyl aromatic sulfonate ion, an aromatic sulfodicarbonate ion, and an aromatic quinine sulfonate ion. By equipping with such an electrolytically polymerized layer containing the second dopant, excellent ESR characteristics and heat resistance can be given to the solid electrolytic capacitor.

Here, the aromatic polysulfonate ion is characterized by having two or more sulfonate ion groups, and specific examples thereof include a benzene polysulfonate ion, a naphthalene polysulfonate ion, and a teterahydronaphthalene polysulfonate ion, which are substituted or unsubstituted with an alkyl group.

The benzene polysulfonate ion is represented by a Formula (5) described below.

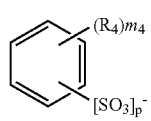

(5)

In Formula (5), $m_4$ is the number of an alkyl group ($R_4$ group) and can be an arbitrary integer of 0 or more with a range in which substitution is possible. Further, $R_4$ represents an alkyl group having 1 to 20 carbon atoms. The benzene sulfonate ion containing one or more alkyl groups ($R_4$ groups) ($m_4 \geq 1$) has a large emulsifying power to the conductive polymer to easily dissolve compared with the benzene sulfonate ion not containing an alkyl group ($R_4$ group) ($m_4=0$).

When the number of carbon atoms in the alkyl group ($R_4$ group) exceeds 20, heat resistance tends to decrease. Moreover, in the case of containing two or more alkyl groups ($R_4$ groups), the number of carbon atoms in each alkyl group ($R_4$ group) may be different from each other or may be the same. Further, p is the number of a sulfonate ion group ($SO_3^-$ group) and can take an arbitrary number of 2 or more with a range in which substitution is possible.

Specific examples of the benzene polysulfonate ion represented by Formula (5) include a benzene disulfonate ion, a dimethylbenzene disulfonate ion, a monododecylbenzene disulfonate ion, a benzene trisulfonate ion, a dimethylbenzene trisulfonate ion, a monododecylbenzene trisulfonate ion, and the like. The difference in the number of a sulfonate ion group ([$SO_3^-$] group) and the number of the alkyl group ($R_4$) does not largely affect the ESR reduction and heat resistance of the solid electrolytic capacitor, any of a disulfonate body, a trisulfonate body, and the like may be used, and any of a monoalkyl body, a dialkyl body, a trialkyl body, and the like may be used.

The naphthalene polysulfonate ion is represented by a Formula (6) described below.

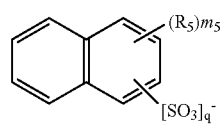

(6)

In Formula (6), q is the number of a sulfonate ion group ([$SO_3^-$] group) and can take an arbitrary number of 2 or more with a range in which substitution is possible. $m_5$ is the number of an alkyl group ($R_5$ group) and can be an arbitrary integer of 0 or more with a range in which substitution is possible. Further, $R_5$ represents an alkyl group having 1 to 20 carbon atoms. The naphthalene sulfonate ion containing one or more alkyl groups ($R_5$ groups) ($m_5 \geq 1$) has a large emulsifying power to the conductive polymer to easily dissolve compared with the naphthalene sulfonate ion not containing an alkyl group ($R_5$ group) ($m_5=0$). In the case of containing two or more alkyl groups ($R_5$ groups), the number of carbon atoms in each alkyl group ($R_5$ group) may be different from each other or may be the same. Moreover, in Formula (6), the alkyl group ($R_5$ group) and the sulfonate ion group ($SO_3^-$ group) can be at any positions of a naphthalene ring with a range in which hydrogen in the naphthalene ring can be substituted as long as the orientation condition is satisfied.

Specific examples of the naphthalene polysulfonate ion represented by Formula (6) include a naphthalene disulfonate ion, a dimethylnaphthalene disulfonate ion, a dibutylnaphthalene disulfonate ion, a naphthalene trisulfonate ion, a dimethylnaphthalene trisulfonate ion, a dibutylnaphthalene trisulfonate ion, and the like. The difference in the number of the sulfonate ion group ([$SO_3^-$] group) and the number of the alkyl group ($R_5$) does not largely affect the ESR reduction and heat resistance of the solid electrolytic capacitor, any of a disulfonate body, a trisulfonate body, and the like may be used, and any of a monoalkyl body, a dialkyl body, a trialkyl body, and the like may be used.

The tetrahydronaphthalene polysulfonate ion is represented by a Formula (7) described below.

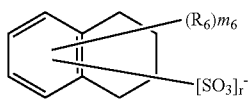

(7)

In Formula (7), r is the number of a sulfonate ion group ([$SO_3^-$] group) and can take an arbitrary number of 2 or more with a range in which substitution is possible. $m_6$ is the number of an alkyl group ($R_6$ group) and can be an arbitrary integer of 0 or more with a range in which substitution is possible. Further, $R_6$ represents an alkyl group having 1 to 20 carbon atoms. The tetrahydronaphthalene sulfonate ion containing one or more alkyl groups ($R_6$ groups) ($m_6 \geq 1$) has a large emulsifying power to the conductive polymer to easily dissolve compared with the tetrahydronaphthalene sulfonate ion not containing an alkyl group ($R_6$ group) ($m_6=0$). In the case of containing two or more alkyl groups ($R_6$ groups), the number of carbon atoms in each alkyl group ($R_6$ group) may be different from each other or may be the same. Moreover, in Formula (7), the alkyl group ($R_6$ group) and an sulfonate ion group ($SO_3^-$ group) can be at any positions of an aromatic ring with a range in which the hydrogen in the aromatic ring can be substituted and as long as the orientation condition is satisfied.

Specific examples of the tetrahydronaphthalene sulfonate ion represented by Formula (7) include a tetrahydronaphthalene disulfonate ion, a monobutyltetrahydronaphthalene disulfonate ion, an isopropyltetrahydronaphthalene disulfonate ion, a tetrahydronaphthalene trisulfonate ion, a dibutyltetrahydronaphthalene trisulfonate ion, and the like. The difference in the number of the sulfonate ion group ([$SO_3^-$] group) and the number of the alkyl group ($R_6$) does not largely affect the ESR reduction and heat resistance of the solid electrolytic capacitor, any of a disulfonate body, a trisulfonate body, and the like may be used, and any of a monoalkyl body, a dialkyl body, a trialkyl body, and the like may be used.

The alkyl group of the alkyl substituted aromatic polysulfonate ion may be a substituted alkyl group, a part of which ($R_4$, $R_5$, or $R_6$) is substituted. For example, it may be a halogen substituted alkyl group, a part of which is substituted with a halogen group ($F^-$ group, $Cl^-$ group, $Br^-$ group, or $I^-$ group). Specifically, it includes a fluoroalkylbenzene polysulfonate ion, a fluoroalkylnaphthalene polysulfonate ion, a fluoroalkyltetrahydronaphthalene sulfonate ion, a chloroalkylbenzene sulfonate ion, a chloroalkylnaphthalene sulfonate ion, a chloroalkyltetrahydronaphthalene sulfonate ion, a bromoalkylbenzene sulfonate ion, a bromoalkylnaphthalene sulfonate ion, and the like.

Further, examples of the carbonyl aromatic sulfonate ion include a carbonylbenzene sulfonate ion, a carbonylnaphthalene sulfonate ion, a carbonyltetrahydronaphthalene sulfonate ion, and the like. The carbonylbenzene sulfonate ion is represented by a Formula (8) described below.

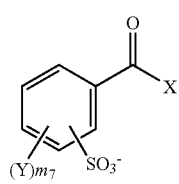

(8)

In Formula (8), X is any of groups selected from the group consisting of an alkyoxy group, an alkenyloxy group, an alkynyloxy group, an aryloxy group, an amino group, an N-alkylamino group, an N,N-dialkylamino group, an N-arylamino group, and an N-diarylamino group. Y is any of groups selected from a hydrogen atom, a halogen atom, an alkyl group, an aryl group, an alkoxy group, and an aryloxy group. $m_7$ is the number of a substituent Y and can be an arbitrary integer of 0 or more with a range in which substitution is possible. Further, an sulfonate ion group ($SO_3^-$ group) and substituent Y can be at any positions with a range in which substitution is possible.

Specific examples of the aromatic quinine sulfonate ion include a benzoquinone sulfonate ion, a naphthoquinone sulfonate ion, and an anthraquinone sulfonate ion.

The first electrolytically polymerized layer and second electrolytically polymerized layer are formed by electrolytic polymerization using an electrolytic polymerization liquid containing a monomer forming the conductive polymer and the first dopant or the second dopant, respectively. Here, the first electrolytically polymerized layer preferably does not contain the second dopant, and the second electrolytically polymerized layer preferably does not contain the first dopant.

Capacitor element 8 shown in FIG. 1 can be obtained by forming the first electrolytically polymerized layer and the second electrolytically polymerized layer described above one by one as solid electrolytic layer 3 on dielectric coating film 2 formed on the peripheral surface of anode body 1, and forming carbon layer 4 and silver paste layer 5 as a cathode lead-out layer on this peripheral surface. The solid electrolytic capacitor shown in FIG. 1 is produced by connecting anode lead 10 of capacitor element 8 with anode terminal 20, connecting silver paste layer 5 with cathode terminal 21, coating capacitor element 8 with an exterior resin 7 excluding a part of anode terminal 20 and cathode terminal 21, and bending the exposed anode terminal 20 and cathode terminal 21 along the surface of exterior resin 7. Moreover, in the present invention, solid electrolytic layer 3 preferably contains a conductive polymer layer formed by chemical polymerization, and the like, besides a conductive polymer layer formed by the electrolytic polymerization. More preferably, the conductive polymer layer formed by chemical polymerization, and the like is arranged between the dielectric coating film and the conductive polymer layer formed by the electrolytic polymerization. The electrolytically polymerized layer is not limited to two layers, and it can be three layers or more.

Hereinafter, the present invention is described in detail by giving examples. However, the present invention is not limited to these.

EXAMPLES

Example 1

The solid electrolytic capacitor shown in FIG. 1 was produced with the following method. First, dielectric coating film 2 was formed on the peripheral surface of anode body 1 made of a valve action metal and equipped with anode lead 10. Next, solid electrolytic layer 3 having three layers was formed by forming a conductive polymer layer on the surface of dielectric coating film 2 with a chemical polymerization method in which pyrrole was used as a monomer, forming a first electrolytically polymerized layer using an electrolytic polymerization liquid containing 0.2 mol/l of pyrrole and 0.1 mol/l of an alkylnaphthalene sulfonate ion on the chemically polymerized layer and then forming a second electrolytically polymerized layer using an electrolytic polymerization liquid containing 0.2 mol/l of pyrrole and 0.1 mol/l of a fluoroalkylnaphthalene polysulfonate ion.

Next, carbon layer 4 and silver paste layer 5 were formed on the surface of the solid electrolytic layer 3 in this order, and capacitor element 8 was formed. Furthermore, anode terminal 20 and cathode terminal 21 were connected with anode lead 10 and silver paste layer 5 respectively, capacitor element 8 was coated with exterior resin 7 excluding a part of anode terminal 20 and cathode terminal 21, the exposed anode terminal 20 and cathode terminal 21 were bent along the surface of exterior resin 7, and the solid electrolytic capacitor shown in FIG. 1 was completed.

Example 2

A solid electrolytic capacitor was produced with the same used amount and method as in Example 1 except for using a naphthalene disulfonate ion instead of a fluoroalkylnaphthalene polysulfonate ion as a dopant used in the formation of the second electrolytically polymerized layer.

Example 3

A solid electrolytic capacitor was produced with the same used amount and method as in Example 1 except for using an alkylbenzene sulfonate ion instead of a alkylnaphthalene sulfonate ion as a dopant used in the formation of the first electrolytically polymerized layer.

Example 4

A solid electrolytic capacitor was produced with the same used amount and method as in Example 3 except for using a naphthalene disulfonate ion instead of a fluoroalkylnaphthalene polysulfonate ion as a dopant used in the formation of the second electrolytically polymerized layer.

Comparative Example 1

A solid electrolytic capacitor was produced in the same manner as in Example 1 except for not forming the second electrolytically polymerized layer.

Comparative Example 2

A solid electrolytic capacitor was produced in the same manner as in Comparative Example 1 except for forming an electrolytically polymerized layer using an electrolytic polymerization liquid containing 0.1 mol/l of fluoroalkylnaphthalene sulfonate ion, 0.1 mol/l of alkylnaphthalene sulfonate ion, and 0.2 mol/l of pyrrole.

ESR (frequency 100 kHz) before a reflow process, ESR (frequency 100 kHz) after the reflow process at 255° C., and the leakage current (measured by applying a voltage of 2.5 V) were measured for the examples and comparative examples. The results are shown in Table 1.

TABLE 1

|  | ESR Before Reflow Process (mΩ) | ESR After Reflow Process (mΩ) | Leakage Current (µA) |
| --- | --- | --- | --- |
| Example 1 | 9.2 | 9.3 | 14 |
| Example 2 | 9.8 | 10.1 | 14 |
| Example 3 | 9.7 | 10.2 | 12 |
| Example 4 | 10.4 | 10.8 | 11 |
| Comparative Example 1 | 11.5 | 12.7 | 14 |
| Comparative Example 2 | 9.4 | 9.6 | 52 |

From Table 1, in the solid electrolytic capacitors of Examples 1 to 4, it is found that ESR is reduced although the leakage current is the same level compared with Comparative Example 1 using a single dopant. Further, in the solid electrolytic capacitors of Examples 1 to 4, it is found that the leakage current becomes remarkably small although the ESR change before and after the reflow process is the same level compared with the solid electrolytic capacitor in Comparative Example 2. From these, the solid electrolytic capacitor in the present invention is superior in leakage current characteristic and ESR characteristic, and is also superior in heat resistance.

As described above, the present invention can be provided with a solid electrolytic capacitor which is superior in ESR characteristics and heat resistance while keeping the leakage current low compared with the case of having one electrolytically polymerized layer containing one type of dopant and the case of having one electrolytically polymerized layer in which a plurality of dopant types having different characteristics are mixed, for example by forming a first electrolytically polymerized layer containing a dopant with an effect of reducing the leakage current so as to make contact with a chemically polymerized layer and forming a second electrolytically polymerized layer containing a dopant having an effect of reducing ESR on the electrolytically polymerized layer (that is, the side close to the cathode lead-out layer).

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor comprising a dielectric coating film, a solid electrolytic layer, and a cathode lead-out layer on a peripheral surface of an anode body in this order, wherein said solid electrolytic layer comprises at least a first electrolytically polymerized layer arranged on said dielectric coating film side and formed by electrolytic polymerization of a monomer, and a second electrolytically polymerized layer arranged on a side closer to said cathode lead-out layer than said first electrolytically polymerized layer and formed by electrolytic polymerization of the same monomer as the monomer used in a formation of said first electrolytically polymerized layer, said first electrolytically polymerized layer contains a first dopant, and said second electrolytically polymerized layer contains a second dopant different from said first dopant, said first dopant is an alkyl aromatic sulfonate ion, an adamantane sulfonate ion, or an adamantane carboxylate ion, and said second dopant is an aromatic polysulfonate ion, a carbonyl aromatic sulfonate ion, or an aromatic quinone sulfonate ion.

2. The solid electrolytic capacitor according to claim 1, wherein
said first electrolytically polymerized layer does not contain a second dopant contained in said second electrolytically polymerized layer.

3. The solid electrolytic capacitor according to claim 2, wherein leakage current is small compared with a solid electrolytic capacitor containing said second dopant in said first electrolytically polymerized layer.

4. The solid electrolytic capacitor according to claim 1, wherein
said second electrolytically polymerized layer does not contain a first dopant contained in said first electrolytically polymerized layer.

5. The solid electrolytic capacitor according to claim 4, wherein equivalent series resistance is low compared with a capacitor containing said first dopant in said second electrolytically polymerized layer.

6. The solid electrolytic capacitor according to claim 1, wherein
said first electrolytically polymerized layer does not contain a second dopant contained in said second electrolytically polymerized layer, and
said second electrolytically polymerized layer does not contain a first dopant contained in said first electrolytically polymerized layer.

7. The solid electrolytic capacitor according to claim 1, wherein said solid electrolytic layer further comprises a chemically polymerized conductive polymer layer arranged between said dielectric coating film and said first electrolytically polymerized layer.

8. The solid electrolytic capacitor according to claim 7, wherein said chemically polymerized conductive polymer layer, said first electrolytically polymerized layer and said second electrolytically polymerized layer are a polymerized layer formed of the same monomer.

9. A method for producing a solid electrolytic capacitor comprising a dielectric coating film, a solid electrolytic layer, and a cathode lead-out layer on a peripheral surface of an anode body in this order, said solid electrolytic layer having at least a first electrolytically polymerized layer arranged on said dielectric coating film side, and a second electrolytically polymerized layer arranged on a side closer to said cathode lead-out layer than said first electrolytically polymerized layer, the method comprising the steps of:
forming said first electrolytically polymerized layer by electrolytic polymerization using a first electrolytic polymerization liquid containing a monomer and a first dopant; and
forming said second electrolytically polymerized layer by electrolytic polymerization using a second electrolytic polymerization liquid containing the same monomer as the monomer contained in said first electrolytic polymerization liquid and a second dopant different from said first dopant.

10. A method for producing the solid electrolytic capacitor according to claim 9, wherein said first electrolytic polymerization liquid does not contain said second dopant contained in said second electrolytic polymerization liquid.

11. A method for producing the solid electrolytic capacitor according to claim 9, wherein said second electrolytic polymerization liquid does not contain said first dopant contained in said first electrolytic polymerization liquid.

12. A method for producing the solid electrolytic capacitor according to claim 9, wherein said first electrolytic polymerization liquid does not contain said second dopant contained in said second electrolytic polymerization liquid, and
said second electrolytic polymerization liquid does not contain said first dopant contained in said first electrolytic polymerization liquid.

13. A method for producing the solid electrolytic capacitor according to claim 9, wherein said first dopant is an alkyl aromatic sulfonate ion, an adamantane sulfonate ion, or an adamantane carboxylate ion.

14. A method for producing the solid electrolytic capacitor according to claim 9, wherein said second dopant is an aromatic polysulfonate ion, a carbonyl aromatic sulfonate ion, or an aromatic quinone sulfonate ion.

15. A method for producing the solid electrolytic capacitor according to claim 9, further comprising:
forming a conductive polymer layer on said dielectric coating film by chemical polymerization of a monomer, wherein
said first electrolytically polymerized layer is formed on said conductive polymer layer.

16. A method for producing the solid electrolytic capacitor according to claim 9, wherein said conductive polymer layer, said first electrolytically polymerized layer and said second electrolytically polymerized layer are a polymerized layer formed of the same monomer.

17. A solid electrolytic capacitor comprising a dielectric coating film, a solid electrolytic layer, and a cathode lead-out layer on a peripheral surface of an anode body in this order, wherein
said solid electrolytic layer comprises a first electrolytically polymerized layer formed by electrolytic polymerization of a monomer, and a second electrolytically polymerized layer arranged on a side closer to said cathode lead-out layer than said first electrolytically polymerized layer and formed by electrolytic polymerization of the same monomer as the monomer used in a formation of said first electrolytically polymerized layer,
said first electrolytically polymerized layer contains an alkylnaphthalene sulfonate ion, and
said second electrolytically polymerized layer contains a naphthalene disulfonate ion.

18. A solid electrolytic capacitor comprising a dielectric coating film, a solid electrolytic layer, and a cathode lead-out layer on a peripheral surface of an anode body in this order, wherein
said solid electrolytic layer comprises a first electrolytically polymerized layer formed by electrolytic polymerization of a monomer, and a second electrolytically polymerized layer arranged on a side closer to said cathode lead-out layer than said first electrolytically polymerized layer and formed by electrolytic polymerization of the same monomer as the monomer used in a formation of said first electrolytically polymerized layer,
said first electrolytically polymerized layer contains an alkylnaphthalene sulfonate ion, and
said second electrolytically polymerized layer contains a fluoroalkylnaphthalene polysulfonate ion.

19. A solid electrolytic capacitor comprising a dielectric coating film, a solid electrolytic layer, and a cathode lead-out layer on a peripheral surface of an anode body in this order, wherein
said solid electrolytic layer comprises a first electrolytically polymerized layer formed by electrolytic polymerization of a monomer, and a second electrolytically polymerized layer arranged on a side closer to said cathode lead-out layer than said first electrolytically polymerized layer and formed by electrolytic polymerization of the same monomer as the monomer used in a formation of said first electrolytically polymerized layer, said first electrolytically polymerized layer contains an alkylbenzene sulfonate ion, and said second electrolytically polymerized layer contains a naphthalene disulfonate ion.

20. A solid electrolytic capacitor comprising a dielectric coating film, a solid electrolytic layer, and a cathode lead-out layer on a peripheral surface of an anode body in this order, wherein said solid electrolytic layer comprises a first electrolytically polymerized layer formed by electrolytic polymerization of a monomer, and a second electrolytically polymerized layer arranged on a side closer to said cathode lead-out layer than said first electrolytically polymerized layer and formed by electrolytic polymerization of the same monomer as the monomer used in a formation of said first electrolytically polymerized layer, said first electrolytically polymerized layer contains an alkylbenzene sulfonate ion, and said second electrolytically polymerized layer contains a fluoroalkylnaphthalene polysulfonate ion.

* * * * *